United States Patent [19]

Black, Jr.

[11] 4,168,473

[45] Sep. 18, 1979

[54] INTERNAL ARRESTER BEAM CLIPPER

[75] Inventor: Maurice D. Black, Jr., Simi Valley, Calif.

[73] Assignee: The United States of America as represented by the Secretary of the Air Force, Washington, D.C.

[21] Appl. No.: 852,771

[22] Filed: Nov. 18, 1977

[51] Int. Cl.² ............................................. H01S 3/08
[52] U.S. Cl. ......................... 331/94.5 C; 331/94.5 D
[58] Field of Search ................... 331/94.5 C, 94.5 D, 331/94.5 T

[56] References Cited

U.S. PATENT DOCUMENTS

| 3,426,293 | 2/1969 | Snitzer | 331/94.5 C |
| 3,573,656 | 4/1971 | Marcatili | 331/94.5 C |
| 3,699,471 | 10/1972 | Mulready et al. | 331/94.5 D |
| 3,980,397 | 9/1976 | Judd et al. | 331/94.5 T |

Primary Examiner—William L. Sikes
Attorney, Agent, or Firm—Joseph E. Rusz; Jacob N. Erlich

[57] ABSTRACT

An internal arresting beam clipper having a cylindrically shaped housing of predetermined length and a clipping mirror located at one end thereof. The clipping mirror is optically aligned with an out-of-round beam as well as being positioned at a preselected angle with respect to the longitudinal axis of the housing. The beam clipper removes the out-of-round portion of the beam by reflecting that portion of the beam against the wall of the housing. The housing acts as a heat sink and absorbs the rejected radiation that has been reflected thereto by the clipping mirror with the bulk of the beam being passed through the clipping mirror and onto a target.

10 Claims, 3 Drawing Figures

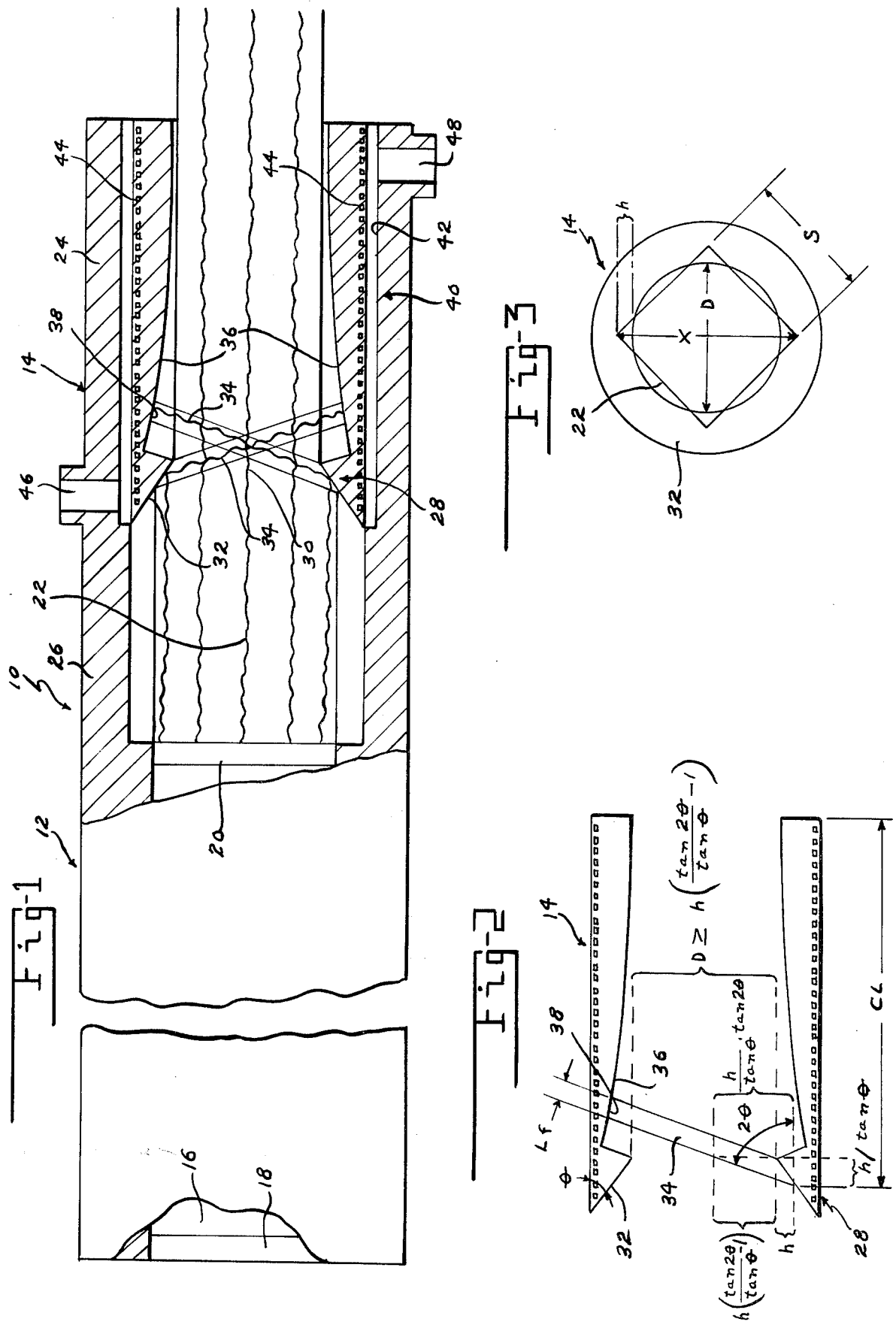

INTERNAL ARRESTER BEAM CLIPPER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly, to an internal arresting beam clipper utilized primarily with a laser in order to remove high intensity, high power portions from out-of-round laser beams and thereby minimize on-target intensity losses due to aperture diffraction.

Lasers are now well established in the art for generating coherent electromagnetic radiation in the optical frequency range. The operation of a laser is based upon the fact that the atomic systems represented by the atoms of the laser material can exist in any of a series of discrete energy level or states, the systems absorbing energy in the optical frequency range in going to a higher state and emitting it when going to a lower state. In the case of ruby as a laser material, three energy levels are utilized. The atomic systems are raised from the lower or ground level to the higher of the three levels by irradiation from a strong light source which need not be coherent but should preferably have a high concentration of energy in the absorbing wavelengths. A radiationless transition then occurs from the highest state to an intermediate or metastable state. This is followed by a transition with photon emission from the intermediate state back to the ground state. It is the last transition that is of interest since this transition is the source of the coherent light or electromagnetic energy produced by the laser.

The operation of raising the energy level of the laser material to produce the desired photon emission is referred to in the art as "pumping" and when more atoms reach an excited metastable state than remain in a lower energy level, a "population inversion" is said to exist.

The active material in the laser is made optically resonant by placing reflectors at either end thereof to form a resonant cavity. The reflector on at least one end is made partially transmissive or is in the form of a pair of reflectors so that there will be an escape from the resonant cavity of a laser beam.

Gas lasers are generally made up of an elongated hollow tube sealed at both ends thereof by a pair of laser windows and filled with any suitable laser reactant mixture. Adjacent the sealing windows are situated the reflective surfaces, forming therebetween the resonant cavity. The lasing action takes place as a result of, for example, a suitable chemical reaction or electron beam excitation.

Generally, in smaller dimensional lasers in which the resonant cavity is of a rectangular cross-sectional configuration, the beam emanating therefrom is out-of-round. In such lasers it is necessary to clip the high intensity, high power portions of the out-of-round laser beam in order to substantially reduce on-target losses due to aperture diffraction.

Previous clipping systems have involved the passing of laser beams through angled mirrors with large central holes. The beam to be projected to the target passes through the center hole while the unwanted corners of the beam are clipped by the surrounding mirror and deflected to a remote absorber. The absorber surface consists of sharply angled facets with highly absorbing surface coatings; these are intended to achieve complete absorption while limiting local Q/A (i.e., beam flux per area or absorbed heat flux) by presenting shallow angles of incidence to the radiation being absorbed. Such an approach represents the general prior art philosophy of clipping and is similar to related calorimeter approaches.

The systems of the past left much to be desired since the requirements for remote absorbers brought about the associated problems of propagation volume and optical aiming associated with the remote absorption. In addition, calorimeter-type converging wedge absorbers produced high heat-flux knife edges, the need for double wall construction and cumbersome design. Clearly a need exists in laser technology for a simplified, reliable and more efficient system of beam clipping than has heretofore been available.

SUMMARY OF THE INVENTION

The internal arresting beam clipper of this invention is readily adaptable for use with a laser and overcomes the problems set forth in detail hereinabove by providing a system in which absorption occurs locally, that is, on surfaces not extending beyond the immediate vicinity of the passing laser beam.

The internal arresting beam clipper of this invention is in the form of a cylindrically-shaped, actively-cooled heat sink incorporated within a housing which may be connected directly to the body of a laser and which is in optical alignment with the laser beam emanating therefrom. The cooled heat sink of the beam clipper of the instant invention absorbs the rejected or unwanted laser radiation that has been reflected to the inner cylindrical housing walls by a conical clipping mirror mounted at one end of the housing.

The clipped beam portions pass from clipping mirror to absorbing surface through a propagation volume already occupied by the main beam, so that additional volume external to the main beam path is not required for handling of the clipped beam portions. Clipper/absorber hardware is reduced substantially with the system of this invention to a light, compact cylindrical package easily integrable into the overall laser system. In addition, the beam clipper of this invention may lend itself to complete integration into other system elements, such as axial flow aerodynamic windows, where extended wall areas are already required and may double as heat sink absorption surfaces.

It is therefore an object of this invention to provide an internal arresting beam clipper which is capable of effectively removing the high intensity, high power portions from out-of-round laser beams.

It is a further object of this invention to provide an internal arresting beam clipper that is readily adaptable for use with or to be formed as a part of a laser system.

It is another object of this invention to provide an internal arresting beam clipper which avoids the high volume optical alignment problems associated with remote absorbers.

It is still another object of this invention to provide an internal arresting beam clipper which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 1 is a side elevational view of the internal arresting beam clipper of this invention incorporated within a laser system and shown partly in cross-section;

FIG. 2 is a schematic representation of the internal arresting beam clipper of this invention; and FIG. 3 is a schematic representation of an end view of the internal arresting beam clipper of this invention.

DETAILED DESCRIPTION OF THE PREFERRED EMBODIMENT

Reference is now made to FIG. 1 of the drawing which represents a laser system 10 made up of a laser 12 having the internal arresting beam clipper 14 of this invention attached thereto. Laser 12 is conventional in construction having a resonant cavity 16 formed between a fully reflective surface 18 at one end thereof and a partially transmissive reflective surface 20 or, in the case of high power lasers, an optical arrangement made up of a pair of reflectors at the other end thereof. Any suitable laser medium is located within resonant cavity 16, the laser medium being "excited" by, for example, a suitable chemical reaction or electron beam excitation.

A laser beam 22 emanates from reflective surface 20. In the case of laser 12 having a resonant cavity 16 of rectangular cross-sectional configuration, laser beam 22 is formed in an out-of-round shape. In such a case it is necessary to clip the high power portions of the out-of-round laser beam 22.

The instant invention relates specifically to the internal arresting beam clipper 14 which can be formed as part of laser system 10 as shown in FIG. 1, or as an independent element for incorporation in any suitable optical system. Since beam clipper 14 is primarily used in conjunction with a laser 12, the description set forth hereinbelow will relate generally to a complete laser system 10 made up of laser 12 and beam clipper 14.

Beam clipper 14 is in the form of a cylindrically-shaped housing 24 which acts as a heat sink in a manner to be described in detail hereinbelow. Housing 24 is either connected to or formed as an integral part of laser 12, being situated in optical alignment with laser beam 22. When formed as an element of laser system 10, housing 24 of beam clipper 14 of this invention is secured to laser 12 by a cylindrically-shaped sleeve 26. Sleeve 26 allows the out-of-round beam 22 to pass onto beam clipper 14.

Situated within cylindrical housing 24 and formed as part of the interior wall thereof is a clipping mirror 28. Clipping mirror 28 is in the form of an axicon mirror which is optically aligned with and faces the unclipped incident laser beam 22. Mirror 28 has a central hole or aperture 30 which passes the bulk of beam 22, to be delivered to a target, while the outer reflective ring 32 of mirror 28 clips the corners of incident beam 22 and reflects this radiation 34 to the inner contoured wall 36 on the opposite side of beam clipper 14 of this invention. The conical half angle of clipping mirror 28 is less than 45° in order that the reflected portion 34 of beam 22 will pass behind mirror 28 on the opposite side of aperture 30.

The arrangement which makes up beam clipper 14 of this invention is clearly illustrated in FIGS. 2 and 3 of the drawing. This invention requires that angle $\theta$ be sufficiently small that $$\tan(2\theta) \times (h/\tan\theta) - h \leq D,$$

where
h = Maximum overlap of beam 22 and mirror 28, (clipped diameter of beam 22), with its optimum diameter $$D = S\sqrt{2} / [1.2977 + \frac{0.0044}{M} - \frac{0.3053}{M^2}],$$

S = Beam width for a square (unclipped) beam, and
M = Laser beam (cavity output) magnification.

In addition to the criteria set forth hereinabove, the reflectivity of mirror 28 in the beam clipper 14 of this invention must only be high enough to avoid excessive heating. In some cases it may be possible to polish the base metal of mirror 28 sufficiently to avoid excessive absorbed heat flux therein (Q/A) without the application of a special reflective coating. The absorbed heat flux of mirror 28 is also held down to some extent by the characteristically shallow angle of incidence, $\theta$.

Contoured inner wall 36 of beam clipper 14 is the primary radiation absorption surface of reflected laser beam 34. For proper operativeness of this invention, wall 36 must have sufficient reflectivity to avoid exceeding the absorbed heat flux (Q/A) limits of wall 36 at the first reflection wall footprint 38, yet avoid excessive reflectivity since this will delay absorption and increase chances of radiation leakage. Any highly conductive copper alloy or other highly heat conductive alloy could be used for wall 36 of this invention.

Another critical dimension of the instant invention is the total length (CL) of beam clipper 14. The minimum effective length of beam clipper 14 can be approximated assuming near limiting values of Q/A along the length thereof by the equation:

$$CL \gtrsim L_f\left(1 + \frac{Q/A_I}{Q/A_L} \times \frac{X}{L_f}\right)$$

CL = Total length of clipper 14,
$L_f$ = Length of first reflection wall footprint,
$Q/A_I$ = Incident power flux of beam 22,
$Q/A_L$ = Q/A limit of coolant, and
X = Maximum diagonal cross-sectional dimension of out-of-round beam 22.

In the limit as $L_f \to 0$, the ideal wall contour of this invention would be a logarithmic curve with an initial (1st reflection) slope and curve corresponding to a totally absorbed near-standing reflection at the end of inner absorption wall 36.

The cooling system 40 of beam clipper 14 is in the form of a channel 42 interconnected to a plurality of cooling passageways 44 which run transversely along the back surface of wall 36. An inlet 46 is connected to one end of channel 42 while outlet 48 is connected to the other end thereof. Any suitable coolant flows through cooling system 42 to carry away the heat absorbed by clipping mirror 28 and absorbing walls 36. The coolant capacity of system 42 is simply matched to the clipped beam heat removal requirements of beam clipper 14 in accordance with conventional heat transfer analytical techniques.

During operation an out-of-round or square beam 22 emanates from laser 12 and impinges on beam clipper 14 of this invention. Clipping mirror 28, which faces the unclipped beam 22, allows the bulk of beam 22 to pass therethrough and onto a target while the out-of-round portions of beam 22 are reflected to the inner contoured wall 36 of housing 24 of the beam clipper 14 of this invention. The wall 36 of housing 24 is a predetermined length and appropriately cooled by coolant system 40 in order to absorb the reflected radiation 34. As a result thereof the high intensity, high power portions from the out-of-round laser beam 22 are removed thereby minimizing the on-target intensity losses due to aperture diffraction.

Although this invention has been described with reference to a particular embodiment, it will be understood to those skilled in the art that this invention is also capable of further and other embodiments within the spirit and scope of the appended claims.

I claim:

1. In a laser system having a resonant cavity and a laser medium located within said resonant cavity, the improvement therein being in the form of a beam clipper optically aligned with an out-of-round laser beam emanating from said resonant cavity, said beam clipper comprising an elongated cylindrically-shaped housing, said housing being of a predetermined length, means located at one end of said housing in optical alignment with said out-of-round laser beam for reflecting the out-of-round portion of said beam against the interior wall of said cylindrically-shaped housing, said reflected portion of said beam defining a footprint on said housing wall, said reflecting means being positioned at a preselected angle with respect to the longitudinal axis of said housing and a coolant system operatively associated with said housing for allowing coolant to flow through said coolant system for cooling said reflecting means and said housing whereby said out-of-round beam has said out-of-round portions thereof removed by said beam clipper by directing said out-of-round portions against said wall of said housing for absorption thereof.

2. In a laser system as defined in claim 1 wherein said predetermined length of said housing is defined by the following equation:

$$CL \gtrsim L_f\left(1 + \frac{Q/A_I}{Q/A_L} \times \frac{X}{L_f}\right)$$

wherein
CL = the length of said housing, $L_f$ = the length of said reflected beam footprint on said wall of said housing, $Q/A_I$ = the incident power flux of said laser beam, $Q/A_L$ = the heat flux of said coolant, and X = the maximum diagonal cross-sectional dimension of said out-of-round laser beam.

3. In a laser system as defined in claim 2 wherein said preselected angle of said reflecting means is defined by the following equation:

$$\tan(2\theta) \times (h/\tan\theta) - h \leq D$$

wherein
$\theta$ = said preselected angle, h = the maximum overlap of said beam and said reflecting means, and D = the diameter of said beam after removal of said out-of-round portions.

4. In a laser system as defined in claim 3 wherein said optimum diameter of said beam after removal of said out-of-round portions (D) is defined by the equation:

$$D = S\sqrt{2} / \left(1.2977 + \frac{0.0044}{M} - \frac{0.3053}{M^2}\right)$$

wherein
S = the width of said out-of-round beam and
M = the magnification of said beam.

5. In a laser system as defined in claim 4 wherein said reflecting means is in the form of an axicon mirror.

6. In a laser system as defined in claim 3 wherein said coolant system comprises a plurality of passageways located in said housing and positioned transversely along the back surface of said wall of said housing, and a channel operatively connected to said passageways, said coolant flowing from said channel into said plurality of passageways.

7. A beam clipper for removing the out-of-round portions of a beam in optical alignment therewith comprising an elongated cylindrically-shaped housing, said housing being of predetermined length, means located at one end of said housing in optical alignment with said out-of-round beam for reflecting the out-of-round portion of said beam against the interior wall of said cylindrically-shaped housing, said reflected portion of said beam defining a footprint on said housing wall, said reflecting means being positioned at a preselected angle with respect to the longitudinal axis of said housing and a coolant system operatively associated with said housing for allowing coolant to flow through said coolant system for cooling said reflecting means and said housing whereby said out-of-round beam has said out-of-round portions thereof removed by said beam clipper by directing said out-of-round portions against said housing wall for absorption thereof.

8. A beam clipper as defined in claim 7 wherein said predetermined length of said housing is defined by the following equation:

$$CL \gtrsim L_f\left(1 + \frac{Q/A_I}{Q/A_L} \times \frac{X}{L_f}\right)$$

wherein
CL = the length of said housing, $L_f$ = the length of said reflected beam footprint on said wall of said housing, $Q/A_I$ = the incident power flux of said laser beam, $Q/A_L$ = the heat flux of said coolant, and X = the maximum diagonal cross-sectional dimension of said out-of-round laser beam.

9. A beam clipper as defined in claim 8 wherein said preselected angle of said reflecting means is defined by the following equation:

$$\tan(2\theta) \times (h/\tan\theta) - h \leq D$$

wherein
$\theta$ = said preselected angle, h = the maximum overlap of said beam and said reflecting means, and D = the diameter of said beam after removal of said out-of-round portions.

10. A beam clipper as defined in claim 9 wherein said optimum diameter of said beam after removal of said out-of-round portions (D) is defined by the equation:

$$CL \gtrsim L_f\left(1 + \frac{Q/A_I}{Q/A_L} \times \frac{X}{L_f}\right)$$

wherein
S = the width of said out-of-round beam and
M = the magnification of said beam.

* * * * *

UNITED STATES PATENT AND TRADEMARK OFFICE
CERTIFICATE OF CORRECTION

PATENT NO. : 4,168,473

DATED : 18 September 1979

INVENTOR(S) : Maurice D. Black, Jr.

It is certified that error appears in the above-identified patent and that said Letters Patent are hereby corrected as shown below:

Column 6, lines 63 and 64 (claim 10, line 4), $$\text{"CL} \gtrsim L_f \left[ 1 + \frac{Q/A_I}{Q/A_L} \times \frac{X}{L_f} \right] \text{"} \quad \text{Should read}$$

$$\text{---} D = S\sqrt{2}/(1.2977 + \frac{0.0044}{M} - \frac{0.3053}{M^2}) \text{---}$$

Signed and Sealed this

*Twenty-second* Day of *January 1980*

[SEAL]

Attest:

SIDNEY A. DIAMOND

*Attesting Officer*     *Commissioner of Patents and Trademarks*